(12) United States Patent
Suthar et al.

(10) Patent No.: US 10,491,376 B1
(45) Date of Patent: *Nov. 26, 2019

(54) SYSTEMS, DEVICES, AND TECHNIQUES FOR MANAGING DATA SESSIONS IN A WIRELESS NETWORK USING A NATIVE BLOCKCHAIN PLATFORM

(71) Applicant: Cisco Technology, Inc., San Jose, CA (US)

(72) Inventors: Om Prakash Suthar, Bolingbrook, IL (US); Aeneas Sean Dodd-Noble, Andover, MA (US); Ammar Rayes, San Ramon, CA (US); Ian McDowell Campbell, Littleton, CO (US); Michael David Geller, Weston, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,524

(22) Filed: Sep. 21, 2018

Related U.S. Application Data

(63) Continuation of application No. 16/134,887, filed on Sep. 18, 2018.
(Continued)

(51) Int. Cl.
*H04L 9/32* (2006.01)
*H04L 9/06* (2006.01)
(Continued)

(52) U.S. Cl.
CPC ........ *H04L 9/0637* (2013.01); *H04L 12/1407* (2013.01); *H04L 63/0892* (2013.01);
(Continued)

(58) Field of Classification Search
CPC .. H04L 63/0892; H04L 9/0637; H04W 48/08; H04W 4/24; H04W 12/06
(Continued)

(56) References Cited

U.S. PATENT DOCUMENTS 4,236,068 A    11/1980  Walton
5,642,303 A    6/1997   Small et al.
(Continued)

FOREIGN PATENT DOCUMENTS

WO   WO 2013/020126    2/2013
WO   WO 2014/098556    6/2014
(Continued)

OTHER PUBLICATIONS

Alexandros Kaloxylos,"A survey and an Analysis of network Slicing in 5G networks", IEEE, 2018.*
(Continued)

*Primary Examiner* — Samson B Lemma
(74) *Attorney, Agent, or Firm* — Polsinelli PC

(57) ABSTRACT

A network function (NF) entity in a communication network receives session request data associated with a User Equipment (UE), which includes blockchain authentication data. The NF entity selects a Blockchain Authentication Function (BAF) entity based on the session request data, and exchanges at least a portion of the blockchain authentication data with the BAF entity over a blockchain network interface. The NF entity further receives authentication confirmation data from the BAF entity over the blockchain network interface, and establishes a data session associated with the UE based on the authentication confirmation data.

20 Claims, 7 Drawing Sheets

Related U.S. Application Data

(60) Provisional application No. 62/682,770, filed on Jun. 8, 2018.

(51) Int. Cl.
  *H04L 29/06* (2006.01)
  *H04W 48/08* (2009.01)
  *H04L 12/14* (2006.01)
  *H04W 4/24* (2018.01)
  *H04W 12/06* (2009.01)

(52) U.S. Cl.
  CPC .............. *H04W 48/08* (2013.01); *H04W 4/24* (2013.01); *H04W 12/06* (2013.01)

(58) Field of Classification Search
  USPC ........................................................ 713/168
  See application file for complete search history.

(56) References Cited

U.S. PATENT DOCUMENTS

| | | | |
|---|---|---|---|
| 5,751,223 | A | 5/1998 | Turner |
| 6,812,824 | B1 | 11/2004 | Goldinger et al. |
| D552,603 | S | 10/2007 | Tierney |
| 7,573,862 | B2 | 8/2009 | Chambers et al. |
| D637,569 | S | 5/2011 | Desai et al. |
| 7,975,262 | B2 | 7/2011 | Cozmei |
| 8,010,079 | B2 | 8/2011 | Mia et al. |
| 8,102,814 | B2 | 1/2012 | Rahman et al. |
| 8,260,320 | B2 | 9/2012 | Herz |
| 8,284,748 | B2 | 10/2012 | Borghei |
| 8,300,594 | B1 | 10/2012 | Bernier et al. |
| 8,325,626 | B2 | 12/2012 | Tóth et al. |
| 8,396,485 | B2 | 3/2013 | Grainger et al. |
| 8,446,899 | B2 | 5/2013 | Lei et al. |
| 8,457,145 | B2 | 6/2013 | Zimmerman et al. |
| 8,458,184 | B2 | 6/2013 | Dorogusker et al. |
| D691,636 | S | 10/2013 | Bunton |
| 8,549,638 | B2 | 10/2013 | Aziz |
| 8,553,634 | B2 | 10/2013 | Chun et al. |
| 8,644,301 | B2 | 2/2014 | Tamhankar et al. |
| 8,650,279 | B2 | 2/2014 | Mehta et al. |
| 8,669,902 | B2 | 3/2014 | Pandey et al. |
| 8,676,182 | B2 | 3/2014 | Bell et al. |
| 8,682,279 | B2 | 3/2014 | Rudolf et al. |
| 8,693,367 | B2 | 4/2014 | Chowdhury et al. |
| 8,718,644 | B2 | 5/2014 | Thomas et al. |
| 8,761,174 | B2 | 6/2014 | Jing et al. |
| 8,768,389 | B2 | 7/2014 | Nenner et al. |
| 8,849,283 | B2 | 9/2014 | Rudolf et al. |
| 8,909,698 | B2 | 12/2014 | Parmar et al. |
| 8,958,318 | B1 | 2/2015 | Hastwell et al. |
| 9,060,352 | B2 | 6/2015 | Chan et al. |
| 9,130,859 | B1 | 9/2015 | Knappe |
| 9,173,084 | B1 | 10/2015 | Foskett |
| 9,173,158 | B2 | 10/2015 | Varma |
| D744,464 | S | 12/2015 | Snyder et al. |
| 9,270,709 | B2 | 2/2016 | Shatzkamer et al. |
| 9,271,216 | B2 | 2/2016 | Friman et al. |
| 9,281,955 | B2 | 3/2016 | Moreno et al. |
| D757,424 | S | 5/2016 | Phillips et al. |
| D759,639 | S | 6/2016 | Moon et al. |
| 9,369,387 | B2 | 6/2016 | Filsfils et al. |
| 9,389,992 | B2 | 7/2016 | Gataullin et al. |
| 9,426,305 | B2 | 8/2016 | De Foy et al. |
| D767,548 | S | 9/2016 | Snyder et al. |
| 9,467,918 | B1 | 10/2016 | Kwan |
| D776,634 | S | 1/2017 | Lee et al. |
| 9,544,337 | B2 | 1/2017 | Eswara et al. |
| 9,569,771 | B2 | 2/2017 | Lesavich et al. |
| 9,609,504 | B2 | 3/2017 | Karlqvist et al. |
| 9,615,268 | B2 | 4/2017 | Navarro et al. |
| 9,634,952 | B2 | 4/2017 | Gopinathan et al. |
| 9,642,167 | B1 | 5/2017 | Snyder et al. |
| 9,654,344 | B2 | 5/2017 | Chan et al. |
| 9,712,444 | B1 | 7/2017 | Bolshinsky et al. |
| 9,713,114 | B2 | 7/2017 | Yu |
| 9,736,056 | B2 | 8/2017 | Vasseur et al. |
| 9,762,683 | B2 | 9/2017 | Karampurwala et al. |
| 9,772,927 | B2 | 9/2017 | Gounares et al. |
| 9,820,105 | B2 | 11/2017 | Snyder et al. |
| D804,450 | S | 12/2017 | Speil et al. |
| 9,858,559 | B2 | 1/2018 | Raleigh et al. |
| 9,860,151 | B2 | 1/2018 | Ganichev et al. |
| 9,933,224 | B2 | 2/2018 | Dumitriu Dan Mihai et al. |
| 9,923,780 | B2 | 3/2018 | Rao et al. |
| 9,961,560 | B2 | 5/2018 | Farkas et al. |
| 9,967,906 | B2 | 5/2018 | Verkaik et al. |
| 9,980,220 | B2 | 5/2018 | Snyder et al. |
| 9,985,837 | B2 | 5/2018 | Rao et al. |
| 9,998,368 | B2 | 6/2018 | Chen et al. |
| 10,108,954 | B2 * | 10/2018 | Dunlevy ................. G06Q 20/36 |
| 10,123,202 | B1 * | 11/2018 | Polehn .................. H04W 8/183 |
| 10,164,779 | B2 * | 12/2018 | Uhr ........................ H04L 9/3265 |
| 2003/0087645 | A1 | 5/2003 | Kim et al. |
| 2003/0116634 | A1 | 6/2003 | Tanaka |
| 2004/0029576 | A1 * | 2/2004 | Flykt ..................... H04L 63/0869 |
| | | | 455/422.1 |
| 2004/0203572 | A1 | 10/2004 | Aerrabotu et al. |
| 2005/0090225 | A1 | 4/2005 | Muehleisen et al. |
| 2005/0169193 | A1 | 8/2005 | Black et al. |
| 2005/0186904 | A1 | 8/2005 | Kowalski et al. |
| 2006/0022815 | A1 | 2/2006 | Fischer et al. |
| 2006/0030290 | A1 | 2/2006 | Rudolf et al. |
| 2006/0092964 | A1 | 5/2006 | Park et al. |
| 2006/0126882 | A1 | 6/2006 | Deng et al. |
| 2006/0187866 | A1 | 8/2006 | Werb et al. |
| 2007/0037605 | A1 | 2/2007 | Logan |
| 2007/0239854 | A1 | 10/2007 | Janakiraman et al. |
| 2008/0037715 | A1 | 2/2008 | Prozeniuk et al. |
| 2008/0084888 | A1 | 4/2008 | Yadav et al. |
| 2008/0101381 | A1 | 5/2008 | Sun et al. |
| 2008/0163207 | A1 | 7/2008 | Reumann et al. |
| 2008/0233969 | A1 | 9/2008 | Mergen |
| 2009/0129389 | A1 | 5/2009 | Halna DeFretay et al. |
| 2009/0203370 | A1 | 8/2009 | Giles et al. |
| 2009/0282048 | A1 | 11/2009 | Ransom et al. |
| 2009/0298511 | A1 | 12/2009 | Paulson |
| 2009/0307485 | A1 | 12/2009 | Weniger et al. |
| 2010/0039280 | A1 | 2/2010 | Holm et al. |
| 2010/0097969 | A1 | 4/2010 | De Kimpe et al. |
| 2011/0087799 | A1 | 4/2011 | Padhye et al. |
| 2011/0142053 | A1 | 6/2011 | Van Der Merwe et al. |
| 2011/0182295 | A1 | 7/2011 | Singh et al. |
| 2011/0194553 | A1 | 8/2011 | Sahin et al. |
| 2011/0228779 | A1 | 9/2011 | Goergen |
| 2012/0023552 | A1 | 1/2012 | Brown et al. |
| 2012/0054367 | A1 | 3/2012 | Ramakrishnan et al. |
| 2012/0088476 | A1 | 4/2012 | Greenfield |
| 2012/0115512 | A1 | 5/2012 | Grainger et al. |
| 2012/0157126 | A1 | 6/2012 | Rekimoto |
| 2012/0167207 | A1 | 6/2012 | Beckley et al. |
| 2012/0182147 | A1 | 7/2012 | Forster |
| 2012/0311127 | A1 | 12/2012 | Kandula et al. |
| 2012/0324035 | A1 | 12/2012 | Cantu et al. |
| 2013/0029685 | A1 | 1/2013 | Moshfeghi |
| 2013/0039391 | A1 | 2/2013 | Skarp |
| 2013/0057435 | A1 | 3/2013 | Kim |
| 2013/0077612 | A1 | 3/2013 | Khorami |
| 2013/0088983 | A1 | 4/2013 | Pragada et al. |
| 2013/0107853 | A1 | 5/2013 | Pettus et al. |
| 2013/0108263 | A1 | 5/2013 | Srinivas et al. |
| 2013/0115916 | A1 | 5/2013 | Herz |
| 2013/0145008 | A1 | 6/2013 | Kannan et al. |
| 2013/0155906 | A1 | 6/2013 | Nachum et al. |
| 2013/0191567 | A1 | 7/2013 | Rofougaran et al. |
| 2013/0203445 | A1 | 8/2013 | Grainger et al. |
| 2013/0217332 | A1 | 8/2013 | Altman et al. |
| 2013/0232433 | A1 | 9/2013 | Krajec et al. |
| 2013/0273938 | A1 | 10/2013 | Ng et al. |
| 2013/0317944 | A1 | 11/2013 | Huang et al. |
| 2013/0322438 | A1 | 12/2013 | Gospodarek et al. |
| 2013/0343198 | A1 | 12/2013 | Chhabra et al. |
| 2013/0347103 | A1 | 12/2013 | Veteikis et al. |

(56) References Cited

U.S. PATENT DOCUMENTS

| | | |
|---|---|---|
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0273083 A1 | 9/2017 | Chen et al. |
| 2017/0317997 A1 | 11/2017 | Smith et al. |
| 2017/0332421 A1* | 11/2017 | Sternberg ............... H04W 76/11 |
| 2017/0339706 A1 | 11/2017 | Andreoli-Fang et al. |
| 2017/0364700 A1* | 12/2017 | Goldfarb ................ G06F 21/64 |
| 2018/0063018 A1 | 3/2018 | Bosch et al. |
| 2018/0069311 A1 | 3/2018 | Pallas et al. |
| 2018/0084389 A1 | 3/2018 | Snyder et al. |
| 2018/0137512 A1* | 5/2018 | Georgiadis ............ H04L 9/3239 |
| 2018/0253539 A1* | 9/2018 | Minter .................... G06F 21/32 |
| 2018/0294977 A1* | 10/2018 | Uhr ................... G06F 17/30097 |
| 2019/0005470 A1* | 1/2019 | Uhr ....................... H04L 9/3265 |

FOREIGN PATENT DOCUMENTS

| | | |
|---|---|---|
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

Hui Yang "Blockchain-based Trusted Authentication in Cloud Radio over Fiber Network for 5G" (2017 16th International Conference on Optical Communications and Networks (ICOCN)).*

"Cisco ASR 5x00 Mobility Management Entity Administration Guide," Version 15.0, Cisco Systems, Inc., Last updated Jun. 13, 2014, pp. 1-266.

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: Cisco Mobility Services Engine," Cisco Systems, Inc., Updated Apr. 20, 2015, 8 pages.

"I Love WiFi, the difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Antonioli, Roberto, et al., "Dual Connectivity for LTE-NR Cellular Networks," Research Gate, Sep. 3-6, 2017, pp. 171-175.

Bekan, Adnan, et al., "D5.1: Machine Learning Algorithms Development and Implementation," 2016-2018 eWINE Consortium, 23, 2016, pp. 1-72.

Bogale, Tadilo Endeshaw, et al., "Machine Intelligence Techniques for Next-Generation Context-Aware Wireless Networks," arxiv.org, Jan. 12, 2018, pp. 1-10.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cheng, W., et al., "Path Segment in MPLS Based Sement Routing Network," Network Working Group, Oct. 2017, pp. 1-10.

Christidis, Konstantinos, et al., "Blockchains and Smart Contracts for the Internet of Things," IEEE Access, Special Section on the of Research in Internet of Things (IoT), vol. 4, May 10, 2016, pp. 1-12.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Doyle, Matthew G., "An IP Address Management Solution fora Server Solution Provider," A Dissertation Submitted to the University of Liverpool, Sep. 28, 2005, 116 pages.

Galvan T., Carlos E., et al., "Wifi bluetooth based combined positioning algorithm," International Meeting of Electrical Engineering Research ENIINVIE 2012, Procedia Engineering 35 (2012), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Herb, Daniel, et al., "Roaum: How to Unblock Roaming IoT Using BLockchain," available at https://uploads-ssl.webflow.com/5987a08baeea4300016b7bd9/5a7a6dcee5bc400010a08f2_Roaum_Roaming_IoT_Whitepaper.pdf, pp. 1-14.

(56) References Cited

OTHER PUBLICATIONS

Hsieh, Cynthia, "Location Awareness in VMware View 4.5 and Above," VMware, 2011, 8 pages.

Husain, Syed, et al., "Mobile Edge Computing with Network Resource Slicing for Internet-of-Things," IEEE 2017, pp. 1-7.

Jero, Samuel, et al., "Identifier Binding Attacks and Defenses in Software-Defined Networks," USENIX, The Advanced Computing Systems Association, Aug. 16-18, 2017, 19 pages.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Leonhardt, Ulf, "Supporting Location-Awareness in Open Distributed Systems," May 1998, 186 pages.

Morozov, Yury, "Blockchain Telecom: Bubbletone Blockchain," Dec. 29, 2017, pp. 1-33.

Network Heresy, "NVGRE, VXLAN and What Microsoft is Doing Right," Oct. 3, 2011, 5 pages.

Norwegian National Security Authority, "N-03 Security guidance for switches and routers," Sep. 26, 2012, pp. 1-24.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Shwetha, D., et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.

Sun, et al., "The future of Wi-Fi," IEEE Communications Magazine, vol. 52, No. 11, Nov. 21, 2014, 166 pages.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

Wright, Joshua, "Detecting Wireless LAN MAC Address Spoofing," Jan. 21, 2003, pp. 1-20.

Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

\* cited by examiner

SYSTEMS, DEVICES, AND TECHNIQUES FOR MANAGING DATA SESSIONS IN A WIRELESS NETWORK USING A NATIVE BLOCKCHAIN PLATFORM

CROSS REFERENCE TO RELATED APPLICATIONS

This application is a continuation of U.S. application Ser. No. 16/134,887, filed on Sep. 18, 2018, which in turn, claims priority of U.S. Provisional Patent Application Ser. No. 62/682,770, filed on Jun. 8, 2018, the contents of which are incorporated herein by reference to their entirety.

TECHNICAL FIELD

The present subject matter relates generally to communication networks, and more particularly, to natively integrating blockchain technologies in the context of managing data sessions for User Equipment (UE) in telecommunication networks (e.g., 4G, 5G, etc.)

BACKGROUND

An ever-increasing consumer demand, improved technological advancements (e.g., hardware/software infrastructure), and industry collaboration has driven significant growth in modern telecommunication networks and continues to drive its evolution. Indeed, each iteration or "next generation" of network capabilities, e.g., represented by standards promulgated by a Third Generation Partnership Project (3GPP), interconnects more devices, improves network bandwidth, increases data-rates, and so on. For example, a transition from $3^{rd}$ Generation (3G) networks to $4^{th}$ Generation (4G) networks introduced new network services and connected mobile devices to third party data networks such as the Internet. More recently, a transition is underway from existing 4G networks to new 5G networks, which includes a new service-oriented architecture for provisioning network services/resources in a dynamic, scalable, and customizable fashion (e.g., micro-services, network functions virtualization (NFV), etc.). For example, this service-oriented architecture supports network slices, which employ an isolated set of programmable resources that can implement individual network functions and/or application services through software programs within a respective network slice, without interfering with other functions and services on coexisting network slices. In turn, the service-oriented architecture, including its network slice support, creates opportunities to employ new mechanisms that natively support such dynamic and flexible workload provisioning and improve overall UE mobility.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

Figure 4A:
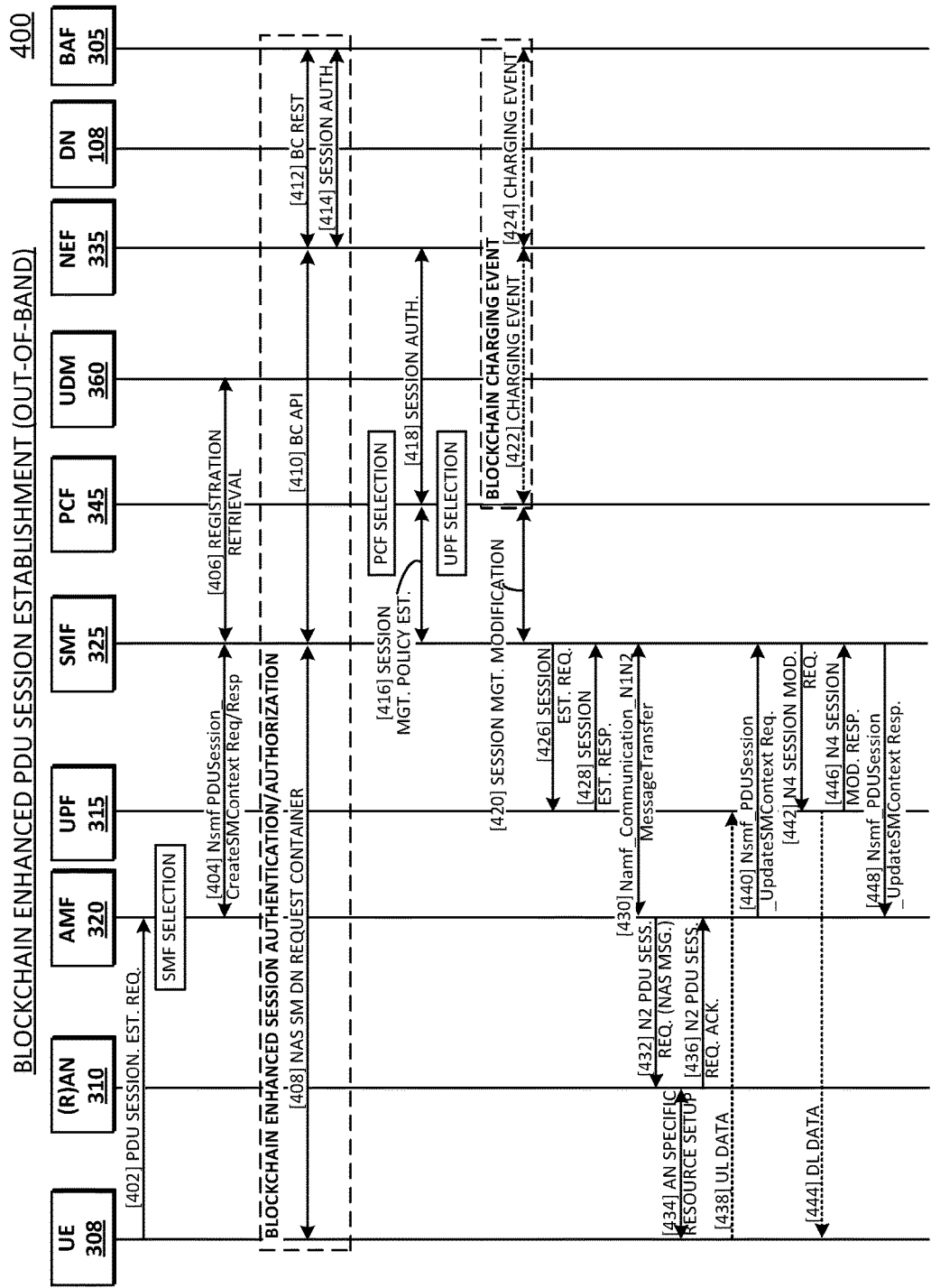
FIG. 4A illustrates a schematic signaling diagram, showing an enhanced blockchain session management procedure for an in-band blockchain authorization.
Figure 4B:
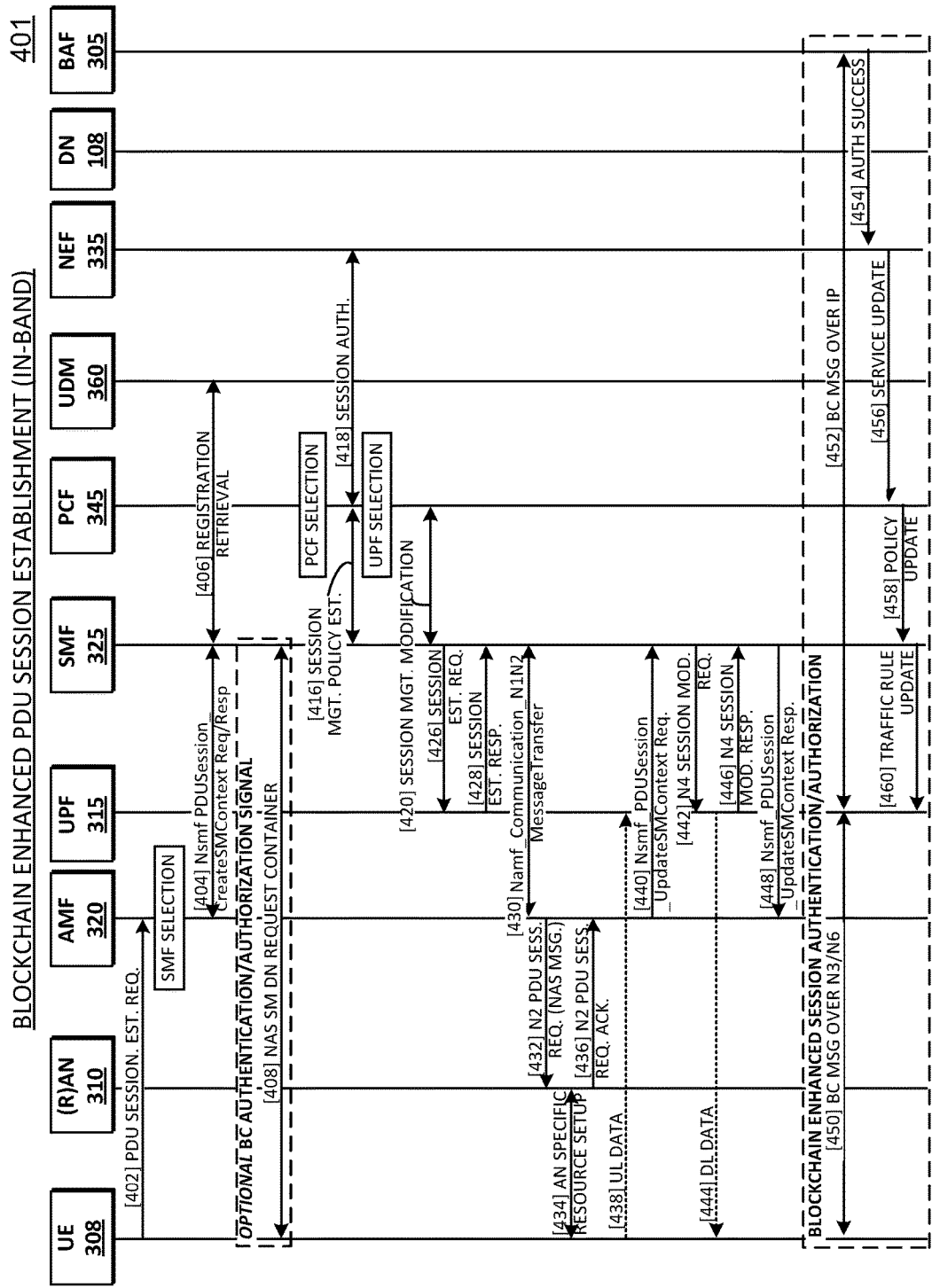
Figure 5:
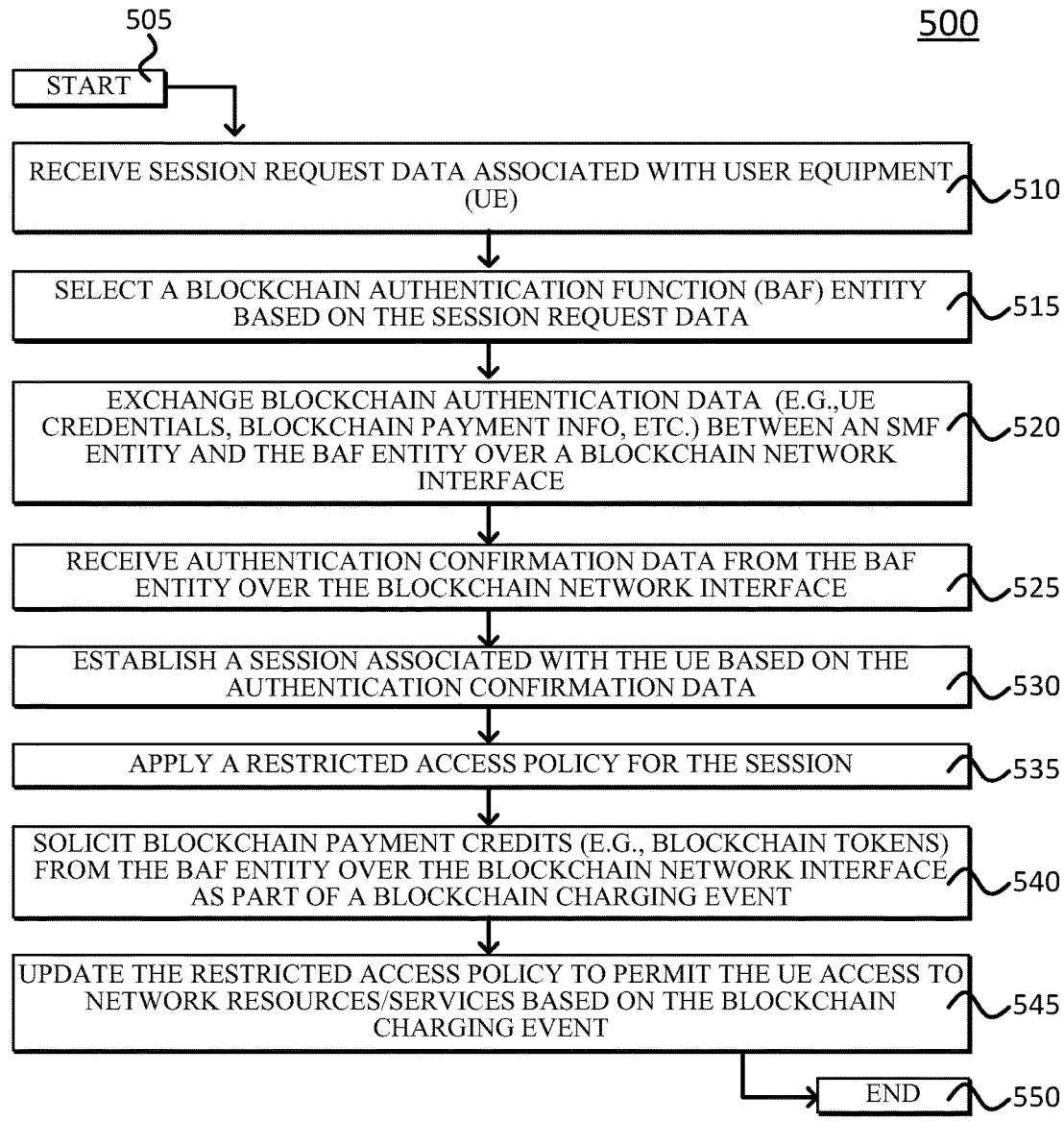

that invokes an Access and Mobility Management Function (AMF) entity;

FIG. 4B illustrates a schematic signaling diagram, showing an enhanced blockchain session management procedure for an out-band blockchain authorization; and FIG. 5 illustrates an example simplified procedure for managing a data session associated with User Equipment (UE) in a communication network, in accordance with one or more embodiments of this disclosure.

DESCRIPTION OF EXAMPLE EMBODIMENTS

Overview

This disclosure describes techniques for managing data sessions (e.g., establishing, hand-over, modify, etc.) for User Equipment (UE) in a telecommunication network (e.g., 4G/5G networks, etc.) using a natively integrated blockchain platform. For example, according to one or more embodiments of this disclosure, a network function (NF) entity in a communication network receives session request data associated with a User Equipment (UE), which includes blockchain authentication data. The NF entity selects a Blockchain Authentication Function (BAF) entity based on the session request data, and exchanges at least a portion of the blockchain authentication data with the BAF entity over a blockchain network interface. The NF entity further receives authentication confirmation data from the BAF entity over the blockchain network interface, and establishes a data session associated with the UE based on the authentication confirmation data.

Description

Various embodiments of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), which include a number of network devices/modules/entities or "Network Function(s)" (NF(s)), which can be implemented as a network element on a dedicated hardware, as a software instance running on a dedicated hardware, and/or as a virtualized function instantiated on an appropriate platform (e.g. on a cloud infrastructure), as is appreciated by those skilled in the art. For sake of clarity, the NFs described herein are based on NFs specified by existing Technical Specifications such as the 3GPP TS 23.501, TS 23.502, TS 24.501, TS 29.509, TS 29.518, TS 33.301, TS 33.501, each of which is incorporated herein by reference to its entirety. Moreover, while some operations and functionality may be described and/or attributed to a particular NF, it is appreciated that such operations are not intended to be limited to the particular NF, but may be performed by other NFs as appropriate, particularly in view of the ongoing development and evolving nature of telecommunication networks.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

Figure 1:
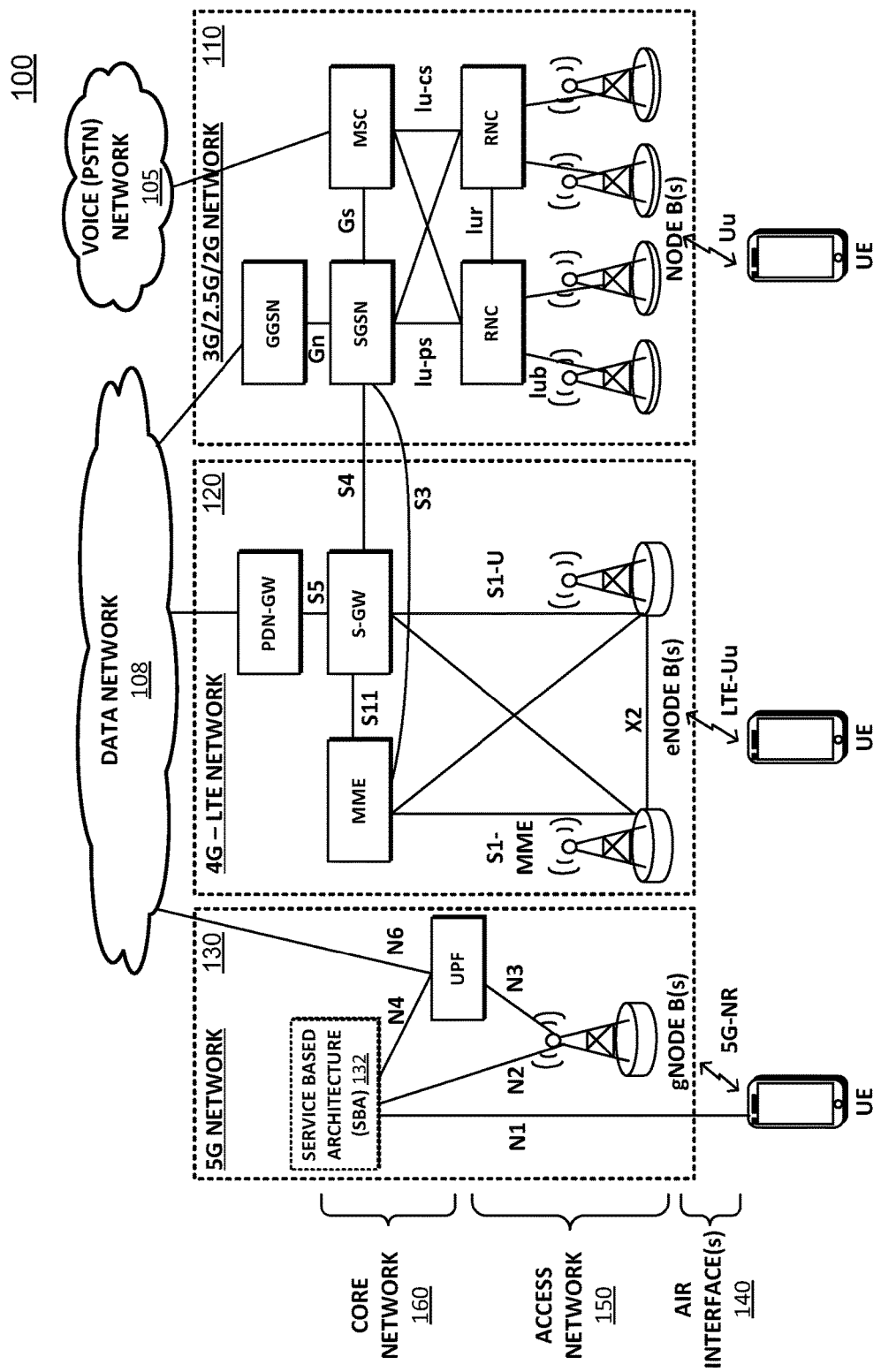
FIG. 1 illustrates a schematic block diagram of exemplary telecommunication networks, including a 3G network, a 4G network, and a 5G network.

FIG. 1 illustrates a schematic block diagram of exemplary telecommunication networks 100, including a 3G network 110, a 4G network 120, and 5G network 130. Telecommunication networks 100 include wireless network interfaces or communication links, such as air interfaces 140, an access network 150, which represents radio infrastructure or radio towers, and a core network 160, which represents respective core network entities, network modules, or Network Functions (NF(s)). The wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 100, including respective interconnected network entities, are illustrated and described herein for purposes of discussion, not limitation, and it is appreciated that the illustrated networks can support inter-network operability/compatibility, and can include (or exclude) any number of network entities, communication links, and the like.

Access network 150 represents the infrastructure or radio towers, such as a Radio Access Network (RAN), for receiving and transmitting data packets between end user nodes (UE) as well as the various network entities (e.g., core network entities). Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks.

Respective network entities that form core network 160 (within the telecommunication networks 100) operatively connect respective RAN infrastructure (NBs, eNBs, gNBs) to third party networks such as a voice network 105 (e.g., a Public Switched Telephone Network (PSTN) network) and/or a data network (DN) 108 to create end-to-end connections. Prior to 3G (e.g., 2G, 2.5G, etc.) the third party network primarily included a voice network/PSTN 105 (e.g., a circuit switched network). From 3G onward, the third party network transitioned to include a public network (e.g., the Internet), represented by data network 108 (e.g., a packet switched network). Core network 160 and its respective network entities collectively operate to manage connections, bandwidth, and mobility for respective UE.

Notably, core network 160 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 110, session management includes a standalone General Packet Radio Service (GPRS) network, while 4G network 120 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

5G network 130, as discussed in greater detail herein, introduces a new service base architecture (SBA) 132, which generally redistributes functionality of 4G network entities into smaller service-based functions/network entities. In addition, packet routing and forwarding functions (which are performed by SGW and PGW in 4G network 120) are realized as services rendered through a new network function/entity called the User Plane Function (UPF) entity. In this fashion, 5G network 130 provides a modular set of services that support dynamic and scalable deployment of resources to satisfy diverse user demands.

Figure 2:
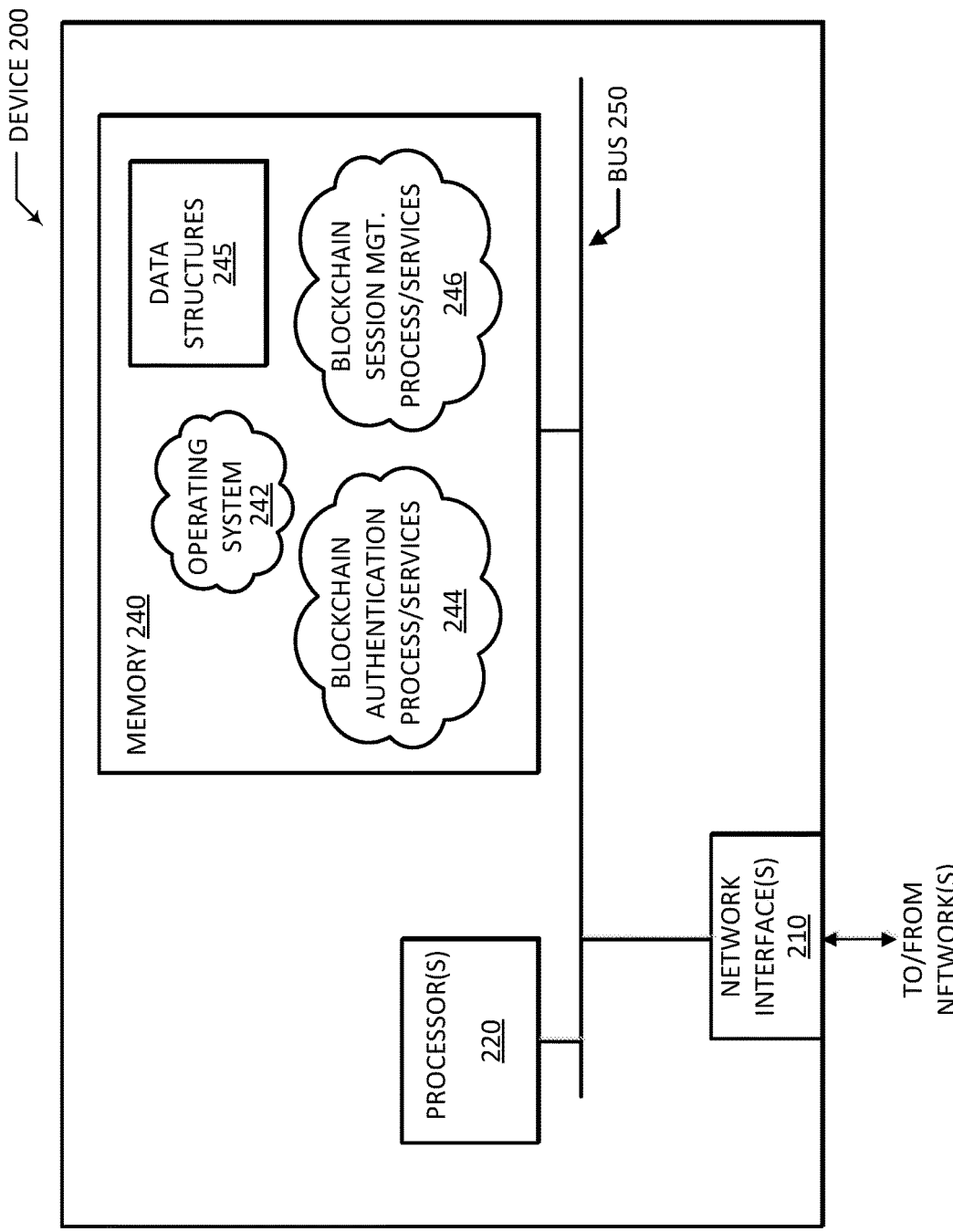
FIG. 2 illustrates a schematic block diagram of an exemplary network device, such as a Network Function (NF) entity/module, according to one or more embodiments of this disclosure.

FIG. 2 illustrates a schematic block diagram of an exemplary network device or Network Function (NF) entity 200 that may be used with one or more embodiments described herein, e.g., particularly as User Equipment (UE) and/or other NFs within SBA 132 (e.g., an Access and Mobility Management Function (AMF) entity, Authentication Server Function (AUSF) entity, Session Management Function (SMF), and so on).

The illustrative device/entity 200 comprises one or more network interfaces 210, at least one processor 220, and a memory 240 interconnected by a system bus 250. Network interface(s) 210 contain the mechanical, electrical, and signaling circuitry for communicating data over links (e.g., wires or wireless links) within the telecommunication networks 100 (e.g., ref. FIG. 1). Network interfaces 210 may be configured to transmit and/or receive data using a variety of different communication protocols, as will be understood by those skilled in the art. Notably, network interfaces 210 may include new blockchain network interfaces (e.g., "BCx", "BCy", and/or "BCz") as discussed in greater detail below.

Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of services and/or software processes executing on the device/module. These services and/or software processes may comprise an illustrative "blockchain registration" process/service 244 as well as a "blockchain session management" process/services 246, as described herein. Note that while processes/services 244 and 246 are shown in centralized memory 240, some embodiments provide for these processes/services to be operated in a distributed communication network.

Illustratively, the techniques described herein may be performed by hardware, software, and/or firmware, such as in accordance with the illustrative blockchain authentication process 244 and/or the illustrative blockchain session management process 246, which may contain computer executable instructions executed by processor 220 to perform functions relating to UE authentication and/or UE session establishment, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having blockchain registration process 244 and/or blockchain session management process 246 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, a transition is currently underway from existing 4G networks to 5G networks, which introduces a new service-oriented architecture (e.g., SBA 132—FIG. 1). While 3G and 4G networks provision network resources and support UE mobility (e.g., registration, session establishment, session maintenance) based on voice network infrastructure (e.g., circuit-switched) and/or conventional data network infrastructure (e.g., packet switched), the 5G networks introduce new service-based approach embodied by the service-oriented architecture. This service-oriented architecture can provision network services/resources in a dynamic, scalable, and customizable fashion using, for example, network slices, micro-services, network functions virtualization (NFV), and so on. With respect to network slices, each network slice can include an isolated set of programmable resources that may implement individual network functions and/or application services through software programs within a respective network slice, without interfering with other functions and services on coexisting network slices. In this fashion, a network slice can include a set of Network Functions (NFs) and corresponding resources (e.g., compute, storage, networking, etc.) Control plane design for 5G networks supports network slices—e.g., network services are represented as NFs and are exposed/available to the network over respective service-based interfaces (SBIs). Once a NF registers its services with a Network Functions Repository Function (NRF) entity, the NF's services are exposed to other NFs such that any authorized consumer can consume.

In order to provision network resources, whether over existing 3G/4G networks or via the new SBA for 5G networks, the UE typically registers or authenticates with the network and further establishes a data session (which describes charging, billing, QoS, etc.) Sessions are typically managed as part of a connectivity service (e.g., PDU Connectivity Service), which defines rules for exchanging data packets (e.g., Protocol Data Units (PDUs)) between the UE and a data network. In the context of 5G networks, each session is typically associated with a respective network slice (e.g., one session belongs to one slice). This disclosure provides complimentary and/or alternative mechanisms such as blockchain registration processes as well as blockchain session management processes to enhance dynamic and flexible workload provisioning, session establishment, and improve overall UE mobility with a natively integrated blockchain platform.

With respect to blockchain, blockchain technologies generally facilitate transparent, verifiable, and secure digital asset transactions with proof of rights and ownership. For example, blockchain technologies generally employ distributed ledger technology (DLT) with built-in cryptography to enable open and trusted exchanges over the internet without requiring central servers and/or independent trusted authorities. However, despite its advantages, existing protocols/network architectures in the telecommunications context fail to support native blockchain technologies due, in part, to underlying security requirements for initial registration processes. For example, while some blockchain technologies can be employed within existing telecommunication networks, mobile network operators and/or mobile network entities are often unaware of any blockchain transaction because such blockchain transaction only occurs after a mobile session is established (e.g., using overlay messages).

Accordingly, embodiments of this disclosure provide a native blockchain platform that employs blockchain operations that can serve as additional, alternative, or supplemental registration processes and/or session management processes within a mobile network. Moreover, the disclosed blockchain processes can operate in conjunction with various mobile Network Functions (NFs) or other network entities (including UE) over new blockchain network interfaces, satisfy security requirements for network service providers, and provide access to new types of devices/users. The native blockchain platform and the blockchain processes of this disclosure support device registration and/or session management in the context of local networks (e.g., the UE is connected to its local/home network) as well as roaming networks (e.g., the UE is outside of its local/home network and attempts to connect to a roaming/visiting network).

Figure 3A:
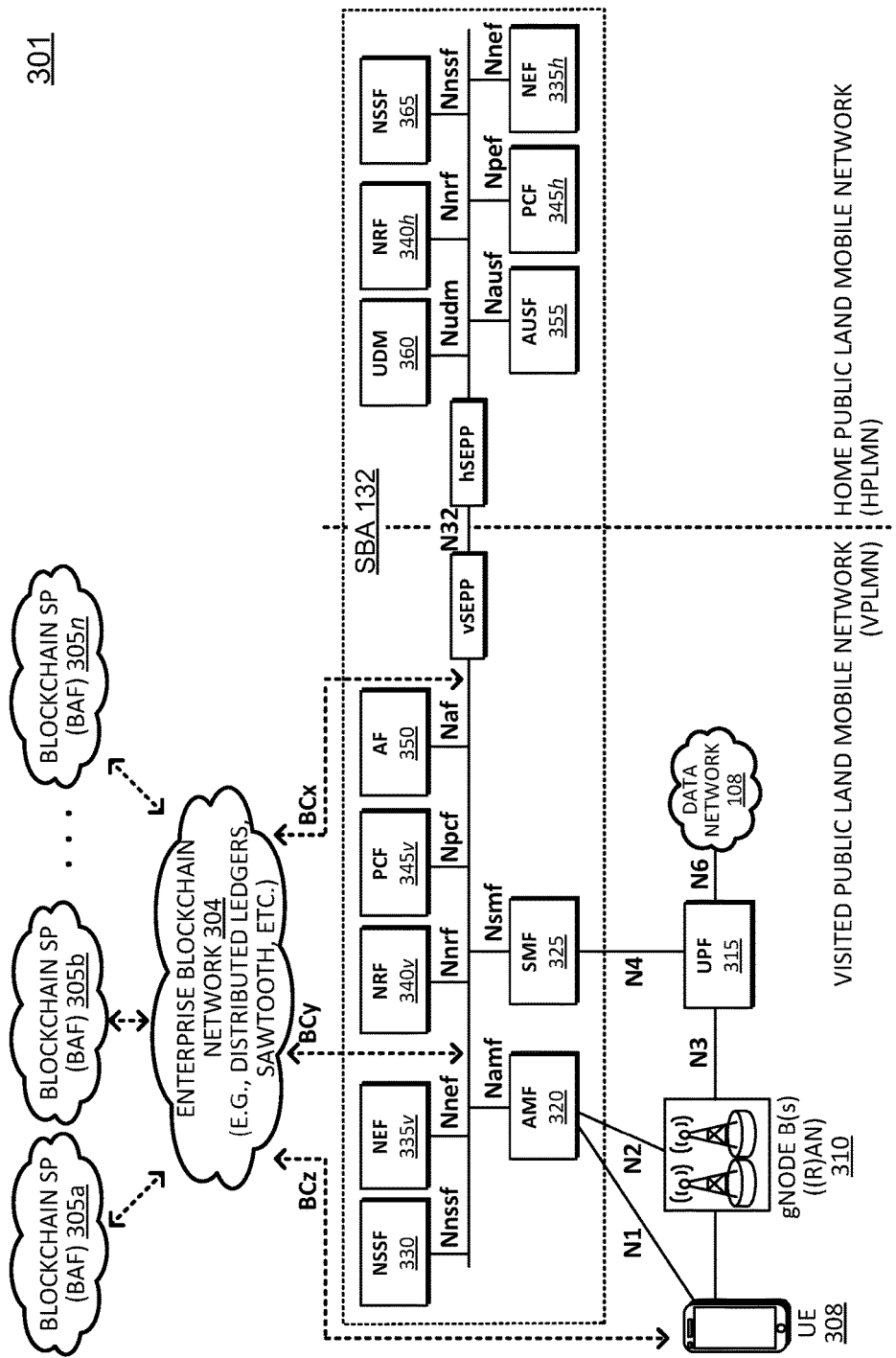
FIG. 3A illustrates schematic block diagram of a roaming architecture with a local breakout scenario for a service based interface representation of a Service Based Architecture (SBA)
Figure 3B:
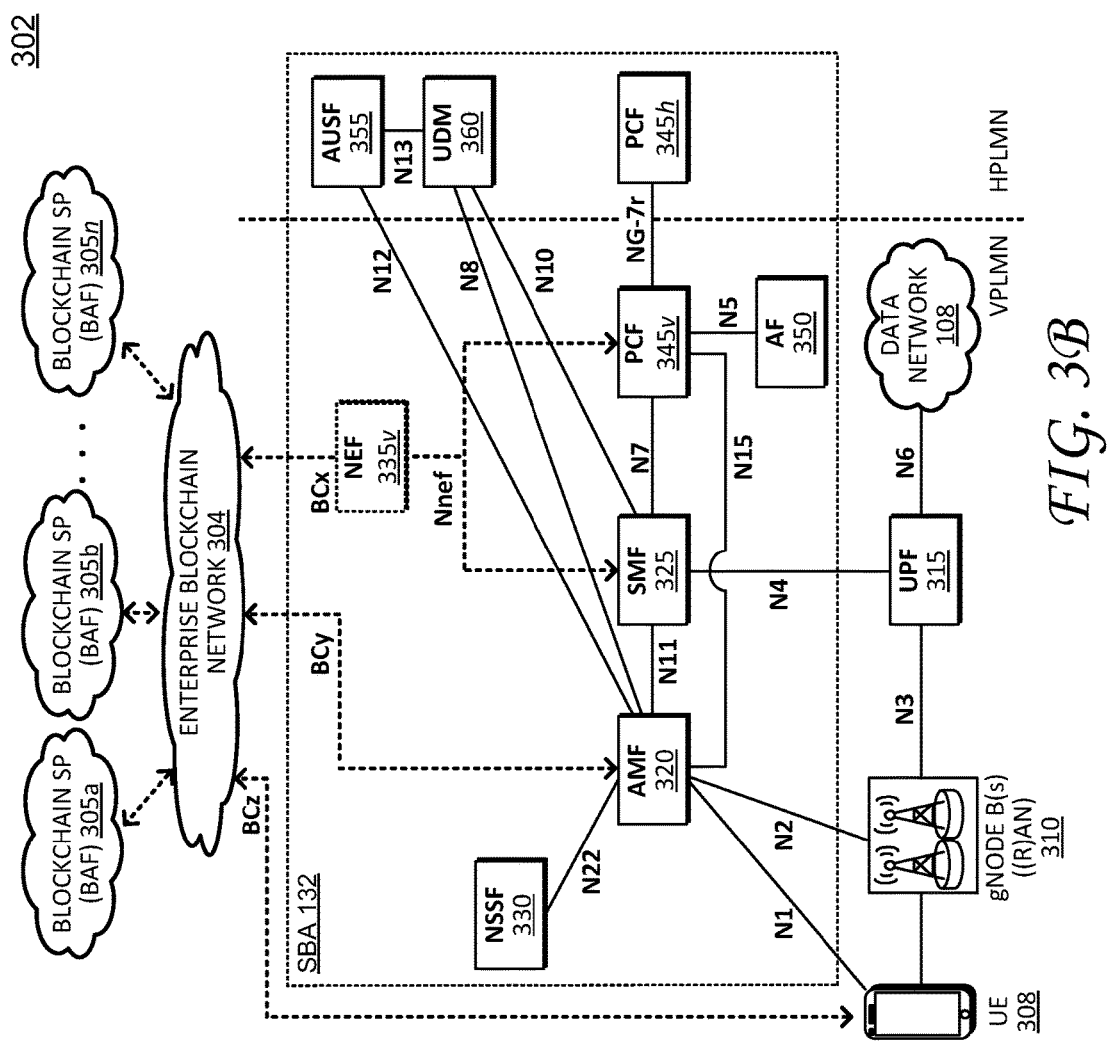
FIG. 3B illustrates a schematic block diagram of reference point representation of the roaming architecture shown in FIG. 3A.

Referring again to the figures, FIG. 3A illustrates a schematic block diagram 301, showing a blockchain platform natively integrated with a Service Based Architecture (e.g., SBA 132) for a 5G network (e.g., 5G network 130), and FIG. 3B illustrates a schematic block diagram 302, showing a reference point architecture for the blockchain platform of FIG. 3A. Collectively, FIGS. 3A and 3B illustrate a native blockchain platform, labelled as an enterprise blockchain network 304. Blockchain network 304 may represent an open source blockchain network or platform such distributed ledgers, hyperledger Sawtooth, and the like. As shown, enterprise blockchain network 304 interconnects blockchain service providers (SPs) or Blockchain Authentication Function (BAF) entities 305a-305n (e.g., distributed ledger technology (DLT) entities, etc.) with other network entities over one or more blockchain network interfaces BCx, BCy, and BCz. Notably, the blockchain network interfaces can represent network interfaces 210 for device/entity 200, discussed above.

The blockchain interfaces represent communication links that facilitate an exchange of messages or data packets between BAF(s) and SBA 132 (e.g., one or more NFs that form SBA 132). In particular, BCx can facilitate exchanging messages related to policy request, authorization, network usage, lawful intercept, accounting, and the like. BCy can facilitate exchanging messages related to secondary authentication, authorization, resource sharing, lawful intercept, network slicing, etc. BCz can facilitate exchanging messages related to standalone Authentication public key preset, authorization, Distributed Ledger Technology query/set, etc.

Blockchain network 304 generally facilitates sharing network resources or access to network functions (NFs), such as Access and Mobility Management Function (AMF), Session Management Function (SMF), Network Repository Function (NRF), and so on, with User Equipment (e.g., UE 308), and creates specific trust boundaries across multiple service providers using distributed blockchain ledgers, as discussed in greater detail herein.

With specific reference to FIG. 3A, schematic block diagram 301 illustrates a roaming architecture with a local breakout scenario for a service based interface representation of SBA 132. As shown, this roaming architecture includes a Visited Public Land Mobile Network (VPLMN) and a Home Public Land Mobile Network (HPLMN). A Public Land Mobile Network (PLMN) is a network established and operated by a carrier for providing mobile communication services to its subscribers. Generally, domestic subscribers for a carrier use roaming to receive services from abroad. A HPLMN refers to the subscriber's home network (e.g., domestic carrier) while VPLMN refers to the subscriber's abroad network (where the UE may be registered while roaming). While FIG. 3A illustrates the roaming architecture with the local breakout scenario, it is appreciated other architectures may be employed (e.g., home routing, etc.). Further, as shown here, some network entities such as the Session Management Function (SMF) and the User Plane Function(s) (UPF(s)) involved in a PDU session management may be under the control of the VPLMN.

Network entities of SBA 132 include AMF 320, SMF 325, Network Slice Selection Function (NSSF) 330, Network Exposure Function (NEF) 335v|335h, Network Repository Function (NRF) 340v|340h, Policy Control Function (PCF) 345v|345h, and Application Function (AF) 350. These network entities can be implemented either as a network element on a dedicated hardware, as a software instance running on a dedicated hardware, or as a virtualized function instantiated on an appropriate platform, e.g., a cloud infrastructure, as is appreciated by those skilled in the art.

In general, UE 308 connects to RAN/Access Network (AN) 310 as well as AMF 320 over respective network interfaces. Here, the RAN can include a base station while the AN can include a base station supporting non-3GPP access, e.g., Wi-Fi access. AMF 320 provides UE-based authentication, authorization, mobility management, etc. Notably, AMF 320 represents a common entity logically associated with all network slices instances that serve UE 308. As part of a registration procedure for UE 308, AMF 320 typically selects network slice instances for UE 308 by, for example, invoking or interacting with NSSF 330 to retrieve appropriate network slice instances based on UE subscription data.

SMF 325 is responsible for session management, IP address allocation to UE(s), and traffic management/selection of a User Plane Function (UPF) (e.g., UPF 315) for proper routing/data transfer. If UE 308 has multiple sessions, different SMFs may be allocated to each session for individual management and/or different functionality per session. In operation, AMF 320 can discover SMF 325 based on session request data from UE 308, as discussed in greater detail below.

AF 350 generally provides information on packet flows to PCF 345v, which is responsible for policy control in order to support Quality of Service (QoS). PCF 345v determines policies about mobility and session management for proper AMF/SMF operations based on the information from AF 350.

AUSF 355 stores authentication data for UE 308, and UDM 360 stores subscription data for UE 308. Data network 108 provides Internet access or operator services.

FIG. 3B illustrates a schematic block diagram 302, showing a reference point interface representation of SBA 132. Reference point representations often help develop detailed call flows in a normative standardization, which are illustrated in FIGS. 4A and 4B, described in greater detail below. It should be noted, for sake of clarity, certain network entities (e.g., NRF 340, etc.) are not shown in schematic block diagram 302. However, it is appreciated that any of the illustrated network entities can interact with the non-illustrated entities as appropriate.

As illustrated, the native blockchain platform includes enterprise blockchain network 304, which interconnects blockchain service providers (SPs), represented as Blockchain Authentication Function (BAF) entities 305a-305n (also referred to as BAF 305 herein), with various mobile network entities over respective blockchain network interfaces BCx, BCy, and BCz.

BCx exchanges messages such as policy requests, authorizations, network usage, lawful intercept, accounting, and etc., BCy exchanges messages such as secondary authentication, authorization, resource sharing, lawful intercept, network slicing, and etc., and BCz exchanges messages such as standalone authentication public key present, authorization, blockchain entity queries/set, and etc.

The native blockchain platform operably supports additional and/or alternative blockchain authentication procedures for registering UE as well as session management procedures for PDN/PDU sessions. Notably, the blockchain authentication procedure/operations may be represented by blockchain authentication process/services 244 and the blockchain session management procedure/operations may be represented by blockchain session management process/services 246 (ref. FIG. 2).

The blockchain authentication procedure generally includes operations to register and attach UE to the network in order to encrypt and protect traffic between the UE and core network entities (e.g., SBA 132), while the blockchain session management procedure generally includes operations to establish sessions (e.g., PDU sessions/PDN sessions) in order to allocate session resources to relevant network slices, permit data transmission between UE 308 and data network 108, ensure appropriate Quality of Service (QoS) connectivity, satisfy Service Level Agreements (SLA(s)), etc.

As discussed in greater detail below, the blockchain session management processes may include authentication/authorization operations, however it is appreciated such operations relate to session management and may be separate from the blockchain authentication procedure for registering and attaching the UE to the network.

For registration and/or session management, the blockchain authentication/authorization operations generally include authentication messages exchanged between one or more core NFs and a Blockchain Authentication Function (BAF) entity, which is exposed to the core NFs over new blockchain network interfaces. The authentication messages provide the BAF with UE credentials and the BAF, in turn, compares the UE credentials against UE credentials stored on a blockchain or distributed ledger. As is appreciated by those skilled in the art, the BAF returns authentication confirmation messages if the UE credentials match the UE credentials stored on the blockchain or distributed ledger.

Collectively referring to FIGS. 3A and 3B, various network entities cooperate to perform initial registration and attachment processes for UE 308. In particular, RAN/Access Network (AN) 310 broadcasts system information (e.g., PLMN-IDs) to various UE(s), including UE 308. UE 308 receives the PLMN-ID from RAN/Access Network (AN) 310 and, during its initial registration, UE 308 indicates support for a complimentary (and/or substitute) blockchain procedures (e.g., a blockchain authentication procedure, a blockchain session establishment procedure, etc.). For example, UE 308 can indicate support for these blockchain procedures in a radio layer message (e.g., a Radio Resource Control (RRC) message) sent to RAN/Access Network (AN) 310.

RAN/Access Network (AN) 310 receives the RRC messages from UE 308 and selects an appropriate AMF 320 (which supports the blockchain procedures) and/or redirects the RRC messages to a new AMF as appropriate. Here, RAN/AN 310 can determine the RRC message from UE 308 include an indication for the disclosed blockchain procedures (e.g., in an access category) and selects AMF 320 and/or redirects to a new AMF based on the AMF blockchain capabilities.

With respect to the blockchain authentication procedure (e.g., for attaching UE 308 to the network), AMF 320 exchanges authentication messages with one or more Blockchain Authentication Function (BAF) entities (e.g., BAF(s) 305*a-n*) over blockchain network interfaces BCx and/or BCy. In particular, AMF 320 may send authentication messages to invoke/request that AUSF 355 perform authentication, which causes AUSF 355 to authenticate UE 308 with BAF 305 over blockchain network interface BCx. In other embodiments, AMF 320 can directly authenticate UE 308 with BAF 305 over blockchain network interface BCy, using for example, REST Application Program Interface (API) messages.

AMF 320 can also receive an indication to perform the blockchain authentication procedure from RRC messages sent RAN/AN network interfaces (which are further transmitted to AMF 320), and/or from Non-Access Stratum (NAS) messages sent directly from UE 308 (e.g., over network interface N1) to AMF 320. In this fashion, the NAS messages can indicate UE 308 supports/request the blockchain authentication procedure, e.g., in payload data such as registration type in the NAS message, and/or in follow-on request data.

Notably, AMF 320 and/or AUSF 355 can also perform conventional authentication processes in addition to the above discussed blockchain authentication operations, depending on service provider or mobile network operator security/integrity policies, as is appreciated by those skilled in the art—e.g., generating/creating encryption keys (e.g., anchor keys), sending authentication requests to AUSF 355, selecting UDM 360, retrieving vectors, e.g., credentials and/or encryption keys, from UDM 360, and so on. In this fashion, the blockchain authentication procedure can complement (or augment) existing authentication processes (e.g., 5G Extensible Authentication Protocol (EAP)—Authentication and Key Agreement (AKA) procedures defined by 3GPP TS 33.301, etc.) to serve as an enhanced or secondary form of security. In other embodiments, however, the blockchain authentication procedure can replace existing authentication processes (e.g., if existing authentication processes fail, etc.)

Still referring to FIGS. 3A and/or 3B, various network entities or NFs also cooperate to manage sessions for UE 308 (e.g., establish sessions, handover sessions, modify sessions, etc.). Sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. This connectivity service can include multiple PDU sessions, which are logical associations created between the 5G core network entities (e.g., SBA 132) and UE 308 to handle data packet exchanges. In the context of a 5G network, session management is flexible, scalable, and accommodates various service continuity modes (e.g., "make before break" options, relocation of core network functions, etc.) while maintaining seamless end-user services. The session management also supports concurrent local and central access to a data network and multi-access edge computing where an application at an edge data center can influence traffic routing to improve its performance.

While session management is illustrated and described herein in the context of 5G networks (e.g., PDU sessions), it is appreciated such session management and related operations can readily apply to 4G networks (e.g., PDN sessions, etc.) For example, as is appreciated by those skilled in the art, 4G networks create sessions using default data bearers (e.g., 4G networks), while the 5G networks establish a PDU session as-needed or on demand, independent of UE attachment procedures. Further, UE(s) can establish multiple PDU sessions to the same data network (or to different data networks) over a single or multiple access networks (e.g., 3GPP networks, non-3GPP networks, etc.) where each PDU session is associated with network slice—e.g., one S-NSSAI and one Data Network Name (DNN). Notably, the PDU sessions can include various session types (e.g., IPv4, IPv6, Ethernet, unstructured, etc.).

In operation, UE 308 initiates session establishment by sending a PDU session request data to AMF 320 (e.g., as part of a PDU Session Establishment Request message). Notably, when UE 308 attaches to the core network (e.g., SBA 132), UE 308 exchanges mobility management messages and session management messages with AMF 320 (e.g., over an NG1 NAS network interface). Session management messages can be transmitted with the mobility management message supported by the NAS routing capability within AMF 320. Although AMF 320 is involved in sending session management messages, processing mobility messages and session management messages typically occurs in AMF 320 and SMF 325, respectively.

AMF 320 receives the PDU session request and discovers/selects an appropriate SMF (e.g., SMF 325) based on parameters included in the initial PDU session request from UE 308, such as session management service identification data, Single Network Slice Selection Assistance Information (S-NSSAI) data, Data Network Name (DNN) data, UE subscriptions, local operator policies, blockchain authentication data/capabilities, etc.). Although AMF 320 may not understand the full context of the session management messages, but it determines/selects an appropriate SMF for a new PDU session based on the above-mentioned parameters.

Here, AMF 320 selects SMF 325 and establishes a PDU session, which allocates PDU resources for a relevant network slice and permits data transmission/data packet exchanges between UE 308 and data network 108. In addition, AMF 320 also ensures that NAS signaling associated with this PDU session is handled by the same SMF (SMF 325) by assigning a PDU session identifier to the PDU session. UE 308, in turn, uses this PDU session identifier to route messages to the correct SMF.

As mentioned, PDU sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. Subscription information for each S-NSSAI can include multiple DNNs and one default DNN. When UE 308 does not specify a DNN in a NAS Message containing PDU Session Establishment Request for a given S-NSSAI, the serving AMF determines the DNN for the requested PDU Session by selecting the default DNN for this S-NSSAI if a default DNN is present in the UE's Subscription Information; otherwise the serving AMF selects a locally configured DNN for this S-NSSAI. If the DNN provided by the UE is not supported by the network and AMF can not select an SMF by querying NRF, the AMF may reject the NAS Message containing PDU Session Establishment Request from the UE with a cause indicating that the DNN is not supported.

Each PDU Session typically supports a single PDU Session type, e.g., supports the exchange of a single type of PDU requested by UE 308 at the establishment of the PDU Session. PDU Sessions are generally established upon UE request, modified upon UE 308/SBA 132 request, and released upon UE 308/SBA 132 request using NAS session management signaling exchanged over the N1 network interface between UE 308 and SMF 325. Upon request from an Application Server, SBA 132 is able to trigger a specific application in UE 308. When receiving the trigger message, UE 308 passes it to the identified application (in UE 308). The identified application in UE 308 may establish a PDU Session to a specific DNN, in accordance with 3GPP TS 32.501, clause 4.4.5.

SMF 325 is responsible of checking whether UE requests are compliant with the user subscription. For this purpose, SMF 325 retrieves and requests to receive update notifications on SMF level subscription data from UDM 360. This subscription data can indicate (e.g., per DNN and per S-NSSAI) allowed PDU Session Types and the default PDU Session Type, allowed SSC modes and the default SSC mode, QoS Information, subscribed Session-AMBR, Default 5QI and Default ARP, static IP address/prefix, subscribed User Plane Security Policy, Charging Characteristics to be associated with the PDU Session, and so on.

In addition, UE 308 may request to move a PDU Session between 3GPP and Non 3GPP accesses. The decision to move PDU Sessions between 3GPP access and Non 3GPP access is made on a per PDU Session basis, e.g., UE 308 may, at a given time, have some PDU Sessions using 3GPP access while other PDU Sessions are using Non 3GPP access. UE 308 typically provides a PDU session ID in a PDU Session Establishment Request message. The PDU session ID is unique per UE and represents a unique identifier assigned to a PDU Session. The PDU session ID can be stored in UDM 360 to support handover between 3GPP and non-3GPP access—e.g., when different PLMNs are used for the two accesses.

While many of the above discussed operations may be performed as part of conventional session management processes, this disclosure further provides blockchain session management processes where one or more network entities/NFs of SBA 132 exchange messages with a Blockchain Authentication Function (BAF) (e.g., one of BAF(s) 305*a-n* over new blockchain interfaces (e.g., BCx, BCy, BCz) in order to establish a session for UE 308. The disclosed blockchain session management processes may complement existing session management processes similar to secondary authentication processes that use an Authentication Authorization, and Accounting (AAA) server in a data network. However, here, the blockchain enterprise platform (e.g., enterprise blockchain network 304 and BAF(s) 305*a-n*) is natively integrated with and directly exposed to SBA 132. It is also appreciated that the blockchain session management processes, in other embodiments, may replace existing session management processes.

In operation, SMF 325 receives session request data associated with UE 308. This session request data may be included as part of a PDU Session Establishment Request message, which may comprise the above-mentioned parameters such as the blockchain authentication data. In some embodiments, AMF 320 initially selects SMF 325 based on the session request data and further forwards the session request data to SMF 325 (once selected). SMF 325 selects a Blockchain Authentication Function (BAF 305) based on the session request data, and further exchanges at least a portion of the blockchain authentication data (e.g., blockchain authentication credentials associated with UE 308)

with BAF 305 over a blockchain network interface (e.g., BCx and/or BCy, where SMF 325 may route messages through AMF 320, etc.)

In some embodiments, SMF 325 may further select an NEF (e.g., NEF 335—shown in a dashed box in FIG. 3B) to act as an Application Program Interface (API) gateway between SMF 325 and BAF 305. In these embodiments, SMF 325 exchanges authentication data with NEF 335, which in turn exchanges messages with BAF 305 over the blockchain network interface. In other embodiments, SMF 325 may directly communicate with BAF 305 over the blockchain network interface.

SMF 325 receives authentication confirmation data from BAF 305 over the blockchain network interface and establishes a session associated with the UE based on the authentication data.

In some embodiments, SBA 132 may apply a restricted access policy to the session while one or more NFs perform a blockchain credit check/charging event process. In particular, SMF 325 can communicate with PCF 345 to obtain payment credits (e.g., blockchain tokens, etc.) in order to ensure the services to be provided to UE 308 align with its creditworthiness. For example, PCF 345 can solicit blockchain payment credits from BAF 305 (e.g., either directly and/or indirectly through NEF 335) over the blockchain network interface. PCF 345 and/or SMF 325 can determine the blockchain payment credits satisfy a payment criteria for one or more network services (e.g., as part of the blockchain charging event), and further remove (or modify) the restricted access policy for the session.

These and other blockchain enhanced session management features are described in greater detail with respect to the schematic signaling diagrams shown in FIGS. 4A and 4B, below.

FIGS. 4A and 4B particularly illustrate respective schematic signaling diagrams 400/402 of the disclosed blockchain enhanced session management processes. Schematic signaling diagrams particularly illustrate an initial session establishment for a PDU session, however, it is appreciated the call flows may be readily modified according to handover operations, switching sessions, requesting sessions for emergency services, and the like.

Blockchain Enhanced PDN Session Establishment with Out-of-Band Blockchain Authorization FIG. 4A illustrates schematic signaling diagram 400 showing call flows for a blockchain enhanced PDU session establishment with an out-of-band authorization operations. In general, the illustrated blockchain session establishment procedure leverages a new blockchain network interface (BCy) to authenticate UE 308 for network services and incorporates NEF 335 to act as an API gateway between SMF 325 and BAF 305. In addition, FIG. 4A illustrates blockchain charging events between BAF 305 and NFs within SBA 132 (e.g., PCF 345/SMF 325) that provides funds directly for one or more network services.

With respect to the illustrated call flow, UE 308 initiates, at step 402, an initial PDU (or PDN) session establishment request and sends session request data (e.g., Non-Access Stratum (NAS) messages) to AMF 320 over network interface N1. The NAS messages can include information such as Single Network Slice Selection Assistance Information (S-NSSAI), Data Network Name (DNN), PDU session IDs, request types, old PDU session IDs, an N1 Service Management (SM) container, indications/requests for blockchain authorization (e.g., as a secondary authorization), and so on.

Notably, the indications/requests for the blockchain authorization can represent a preference by UE 308 for the network (SBA 132) to use blockchain authentication data (e.g., blockchain credentials) to authorize/authenticate UE 308 for a PDU session. In one embodiment, the indication of the blockchain authorization may be specified by the S-NSSAI data, which can include a unique identifier of a network slice. For example, the S-NSSAI data can include a Slice/Service type (SST), denoting expected network behaviour, as well as a Slice Differentiator (SD), differentiating amongst multiple network slices of the same Slice/Service type. Here, UE 308 can provide S-NSSAI data having a particular unique identifier corresponding to blockchain capable network slice.

Alternatively, the indication of the blockchain authorization may be included as one of the SST values in the S-NSSAI data in accordance with 3GPP TS 23.501 (clause 5.15, table 5.15.2.2-1). For example, the SST value may be modified to include the blockchain ID as provided below.

| Slice/Service type | SST value | Characteristics. |
| --- | --- | --- |
| eMBB | 1 | Slice suitable for the handling of 5G enhanced Mobile Broadband. |
| URLLC | 2 | Slice suitable for the handling of ultra- reliable low latency communications. |
| MIoT | 3 | Slice suitable for the handling of massive IoT. |
| Blockchain | X | Slice that uses blockchain for authorization and/or service provisioning. |

In other embodiments, if slicing is orthogonal to the blockchain procedures, the PDU "Request Type" could be set to "guest access with dual authentication", as is appreciated by those skilled in the art.

AMF 320 receives the session establishment request and further discovers/selects an appropriate SMF—here, SMF 325. In particular, AMF 320 discovers and selects SMF 325 based on parameters included in the initial PDU session request (e.g., step 402). As mentioned, these parameters include S-NSSAI data, DNN data, UE subscriptions, local operator policies, blockchain authentication data/blockchain capabilities, and so on.

Here, AMF 320 selects SMF 325 based, at least in part, on its blockchain session capabilities. If AMF 320 does not have an association with an SMF for the PDU session ID (e.g., when Request Type indicates "initial request"), AMF 320 invokes a PDU session creation request (e.g., Nsmf_PDUSession_CreateSMContext Request), as shown at step 404. However, if AMF 320 already has an association with an SMF for the PDU Session ID (e.g., when Request Type indicates "existing PDU Session"), the AMF invokes the Nsmf_PDUSession_UpdateSMContext Request. Notably, the PDU Session creation request can specify a request type set to "guest access with dual authentication" (e.g., if a slice is not explicitly set for blockchain authorization).

At step 406, SMF 325 and UDM 360 exchange registration/subscription information for UE 308. SMF 325 further sends a corresponding PDU session SM context responses (e.g., an SM context identifier) to AMF 320, again at step 404. In this fashion, SMF 325 registers itself for an initial PDU session with UDM 360, in accordance with UE-requested PDU Session Establishment procedures provided by 3GPP TS 23.502.

Steps 408-414 represent operations of the disclosed blockchain session management, including out-of-band blockchain authorization/authentication operations as part of the PDN session establishment. These blockchain authorization/authentication operations may conform to secondary authentication/authorization operations such as Data Network (DN)-Authentication, Authorization, and Accounting (AAA) server, described by 3GPP TS 23.501, clause 5.6.6. However, here, the blockchain authorization/authentication operations leverage the natively integrated blockchain platform (e.g., BAF 305), which is directly exposed to SBA 132 over a new blockchain network interface.

At step 408, UE 308 sends a NAS SM DN Request Container message to SMF 325 to request the blockchain authentication procedure as a secondary authorization for the PDN session (e.g., in accordance with secondary authorization request of 3GPP TS 23.501, clause 5.6.6). The NAS SM DN Request Container message includes blockchain information for PDU session authorization by an external Data Network (e.g., slice information (identified by S-NSSAI), PDU session ID, a PDN it would like to connect to (identified by DNN), a blockchain server ID (identifying BAF 305), etc.). This blockchain information may be provided as part of payload data, and/or may be included as part of follow-on request data.

Although the NAS SM DN Request Container message is illustrated as a single signal between UE 308 and SMF 325, it is appreciated this signal may be conveyed to SMF 325 by AMF 320. For example, UE 308 can send the signal to AMF 320 over the N1 network interface, and AMF 320 can send or forward the signal (or appropriate portions of the signal) to SMF 325 over the N11 network interface. In some embodiments, the NAS SM DN Request Container can include the PDU session establishment request message (e.g., step 402) as part of a N1 SM container, as is appreciated by those skilled in the art.

SMF 325 receives the NAS SM DN Request Container and determines an appropriate BAF entity (or BAF server) based on the blockchain information and local configuration information contained therein. SMF 325 determines BAF 305 as the appropriate blockchain authentication/authorization entity and further exchanges, at step 410, blockchain Application Programming Interface (API) messages with BAF 305 over a blockchain network interface (e.g., BCx network interface). In particular, SMF 325 invokes a Namf_Communication_N1N2MessageTransfer service operation on AMF 320 to transfer the DN Request Container information within N1 SM information sent towards UE 308.

At step 412, SMF 325 exchanges the blockchain API messages with BAF 305, using NEF 335 (which acts as a gateway between SMF 325 and BAF 305). NEF 335 further exchanges, at steps 412/414, corresponding Representational State Transfer (REST) API messages with BAF 305. In this fashion, NEF 335 allows external users (e.g., enterprises/partner operations) to monitor, provision, and enforce application-level policy for users inside the operator network.

Steps 412/414 continues until successful authorization or failure. At step 414, BAF 305 sends NEF 335 authentication confirmation data (e.g., indicating successful session authorization and profile information), which are further sent to SMF 325 at step 410. The authentication confirmation data can include a service name that BAF 305 uses to register available network services for UE 308. In addition, BAF 305 may provide service specific attributes (e.g., application access capabilities, QoS and Data rate profiles and other applications that the user has subscribed to as part of the blockchain contract, etc.) Notably, if authorization fails, the PDU set up request is rejected with appropriate cause code.

After successful authorization, SMF 325 continues with PDU establishment operations and, based on a PDU profile, selects a PCF and performs Session Management Policy Establishment procedure, as shown at step 416. SMF 325 can provide a blockchain flag and associated parameters (if available from UE 308) to indicate to PCF 345 that service capabilities can be obtained from BAF 305 (e.g., and/or via NEF 335). For example, PCF 345 can use the blockchain authentication data (received from SMF 325 at step 416) to identify NEF 335 and/or BAF 305.

PCF 345 requests, at step 418, service parameters from NEF 335, which further obtains the service parameters from BAF 305. Notably, step 418 may be optional, because PCF 345 can use the UDR as per 4.16.4 procedure defined in 3GPP TS 23.502. However, in some instances, the UDR may not have a service profile for all use cases (e.g., where the UE is a guest on the service provider's network). As shown here, PCF 345 retrieves the service profile from NEF 335 (which NEF 335 retrieves from BAF 305). PCF 345 further determines the network services, QoS, and charging plan to be applied to the PDU session associated with UE 308.

SMF 325 further selects a UPF (e.g., UPF 315) to serve the PDU session, and at steps 420-424, SMF 325 performs a blockchain charging event in conjunction with PCF 345, NEF 335, and/or BAF 305, based on the profile information received at step 414.

In particular, SMF 325 requests PCF 345 and NEF 335 to perform the blockchain charging event, which represents a credit request transaction.

The blockchain charging event includes operations for BAF 305 to return blockchain payment credits (e.g., blockchain tokens) to PCF 345 and/or SMF 325 in order to pay for one or more network services for UE 308. For example, the BAF 305 can return blockchain tokens from a blockchain eWallet associated with UE 308.

In some instances, SMF 325 and PCF 345 can return tokens to BAF 305 should all the tokens requested in this step not be consumed. In comparison to other pre-paid services that use quotas from an Online Charging Server (OCS) (not an actual monetary fund), the blockchain charging event represents a prepaid transaction that can include actual funds, which the service provider can return if the contract is not completed in an authorized time period.

The blockchain charging event may include messages exchanged over the N30 network interface, shown at step 422, between PCF 345 and NEF 335. In this fashion, Nnef API messages may be augmented to include appropriate blockchain eWallet messages (requests/returns/etc.)

Step 424 represents trusted communications between NEF 335 with BAF 305 as BAF 305 is a trusted application. However, in some instances, BAF 305 may not be trusted, in which case an Application Function could provide a proxy for these procedures.

In one or more additional embodiments, enhanced blockchain session management operations also accommodate delayed authorization. For example, BAF 305 may require a certain amount of time to conclude a consensus, which may delay its response/fund verifications (e.g., as part of the blockchain charging event). In these instances, SMF 325 can request PCF 345 to notify it when NEF 335 allows the subscription. In addition, SMF 325 concludes the PDU session establishment, but can indicate UPF 315 to place the PDU session in quarantine until further notice (e.g., until BAF 305 concludes the consensus/completes the charging event).

Remaining steps 426-448, may be defined by 3GPP TS 23.502, as is appreciated by those skilled in the art.

Blockchain Enhanced PDN Session Establishment with in-Band Blockchain Authorization FIG. 4B illustrates a schematic signaling diagram 401, showing call flows for a blockchain enhanced PDU session establishment with in-band authorization operations. The in-band blockchain session establishment procedure of FIG. 4B particularly leverages blockchain messages between UE 308 and BAF 305 (and/or through DN 108) using Internet Protocol (IP) datagram encapsulation, as discussed in greater detail below.

Signaling diagram 401 begins at step 402 where, as discussed above, UE 308 initiates a PDU session establishment request. The session establishment call flow follows the above-discussed operations for steps 404 and 406.

At step 408, UE 308 sends a NAS SM DN Request Container message to SMF 325 to request the blockchain authentication procedure as a secondary authorization for the PDN session. As mentioned, the NAS SM DN Request Container message includes blockchain information for PDU session authorization by an external Data Network (e.g., slice information (identified by S-NSSAI), PDU session ID, a PDN it would like to connect to (identified by DNN), a blockchain server ID (identifying BAF 305), etc.) Notably, step 408 represents an optional signal between UE 308 and SMF 325. However, even though it is optional, step 408 helps build trust between the core network (e.g., SBA 132) and BAF 305 (e.g., a Distributed Ledger Technology (DLT) entity). For example, as discussed in greater detail below, until the blockchain authentication procedure results in successful authorization of the UE, UE 308 may only have a temporary connection and the access control list may be restricted. BAF 305 is typically registered and authenticated with NEF 335, and SMF 325 may invoke NEF 335 to pass on the blockchain authentication credentials. Once authorized, UE 308 is notified of successful authorization, and BAF 305 notifies NEF 335, which (in turn) notifies SMF 325 of the successful authorization.

Steps 410-414 (not shown) apply for the out-of-band blockchain authentication operations (e.g., secondary authentication/authorization operations), illustrated in signaling diagram 400. Here, however, signaling diagram 401 illustrates in-band authentication operations, performed later in the signal flow (e.g., steps 450-460), described below.

In proper context, UE 308 is attached to the network at step 408, but does not have an IP address assigned. After step 408, SMF 325 selects PCF 345 based on a PDU profile. PCF 435 performs the Session Management Policy Establishment procedure, shown by steps 416-418. For example, the Session Management Policy Establishment procedure can include operations where SMF 325 establishes the PDU Session with PCF 345, including SMF 325 receiving default PCC Rules for the PDU Session, PCF 345 subscribing to IP allocation/release events in SMF 325, PCF 345 updating policy information in SMF 325, and so on.

Following steps 416-418, SMF 325 selects a UPF (e.g., UPF 315) to serve the PDU session. In case of PDU Type IPv4 or IPv6, SMF 325 allocates an IP address/prefix for the PDU Session as described in 3GPP TS 23.501, clause 5.8.1. In case of a PDU Type IPv6, SMF 325 can allocate an interface identifier to UE 308 for the UE to build its link-local address. For Unstructured PDU Type the SMF may allocate an IPv6 prefix for the PDU Session and N6 point-to-point tunneling (based on UDP/IPv6) as described in 3GPP TS 23.501, clause 5.6.10.3.

Step 420 is modified since the above-discussed out-of-band blockchain authentication operations do not occur (e.g., steps 410-414) here. Instead, at step 420, PCF 345 determines UE 308 requests the blockchain authentication/authorization procedure. For example, SMF 325 can provide a blockchain indication to PCF 345, which blockchain indication can include a blockchain flag, blockchain authentication data, payment data, blockchain entity identifiers, and so on. Here, the blockchain indication includes a blockchain flag, which causes PCF 345 to apply a restricted or guest access policy for the PDU session, pending successful in-band blockchain authorization/authentication operations, discussed below. Put differently, PCF 345 installs a restricted access rule for the PDU session, which may be similar to the rules applied for pre-paid users (e.g., users can access a Domain Name Server (DNS) to resolve the servers and HTTPS port/destination pair to a set of servers, etc.) In some embodiments, the server IP addresses could be returned in step 422 and step 424 as part of a blockchain charging event (not shown here).

If there is a commercial agreement in place, the restricted access policy allows UE 308 access to DN 108 to obtain authentication/authorization and blockchain payment data/tokens from BAF 305. Again, similar to the pre-paid restricted policies, which allows UE 308 to connect to DN 108 through a web portal and enter credit card information, the in-band blockchain authentication/authorization operations represented by steps 450-462 leverage the native blockchain platform to automatically debit blockchain payments/tokens from BAF 305. In this fashion, the subscriber associated with UE 308 only needs to ensure their wallet has funds.

Following step 420, SMF 325 provisions rules on UPF 315, at steps 426-428, to allow DNS requests and REST messages to BAF 305 (e.g., a DLT server address provided by PCF 345).

Steps 430-448 represent signals or messages accordance with UE-requested PDU Session Establishment procedures provided by 3GPP TS 23.502.

Steps 450-460 represent in-band blockchain authentication/authorization signals or messages. While steps 450-460 are illustrated after the PDU session is established at step 448 with a restricted access policy, it is appreciated these signals or messages may begin at step 438 (Up Link (UL) traffic).

At step 450, UE 308 sends blockchain authentication data to UPF 315 using IP datagram encapsulation. UPF 315 acts as a gateway to BAF 305 and sends, at step 452, corresponding blockchain data to BAF 305. In some embodiments, UPF 315 may send messages to other NFs (e.g., SMF 325) and/or over DN 108 for forwarding to BAF 305. However, for sake of simplicity, signaling diagram 401 shows UPF 315 sending the corresponding blockchain data directly to BAF 305. The blockchain authentication data can include, for example, blockchain authentication credentials, blockchain entity identifiers (e.g., corresponding to BAF 305), and other information required by BAF 305 to authenticate/authorize UE 308 as well as to solicit blockchain payment data (e.g., blockchain tokens).

In this fashion, DN 108 may treat the PDU session as a prepaid session and allow approved protocols. In some embodiments, the PDU session may be associated with a timer that can safeguard the session and terminate the session if the PDU authentication/authorization does not conclude within a predetermined timeframe. In these embodiments, UDM 360 can set the timeframe at step 406 and/or the timeframe may be locally configured as part of an APN profile.

Steps 450-452 represent bi-directional messages between UE 308, UPF 315 and BAF 305. Other NFs (e.g., NEF 335, DN 108, etc.) may be invoked or employed as is appreciated by those skilled in the art. The bi-directional messages include blockchain authentication data required by BAF 305 to authenticate/authorize UE 308 as well as to solicit blockchain payment data (e.g., blockchain tokens). If authorization fails at steps 450-452, UE 308 can choose to disconnect from the network. The network (e.g., SBA 132) would be notified at steps 456-458, and may further block UE 308, disconnect the PDU session, or try authentication again.

BAF 305 authenticates (e.g., verifies blockchain credentials for UE 308) the blockchain credentials associated with UE 308 and, if successful, it notifies NEF 335 (step 454), which in turn notifies PCF 345 (step 456) regarding successful authentication. In addition, BAF 305 can return blockchain payment data (e.g., blockchain tokens) to NEF 335 and/or PCF 345. PCF 345 updates the policy/traffic rules for SMF 325, at step 458, which further updates the traffic rules with UPF 315. The updated policy/traffic rules permit UE 308 access to contracted network services (e.g., as specified and/or as paid for by BAF 305).

The call flows or messages shown in FIG. 4B illustrate an in-band blockchain enhanced PDU session establishment procedure where BAF 305 authenticates UE 308 and returns blockchain payment data (e.g., blockchain tokens) to appropriate NFs in SBA 132 using IP datagram encapsulation.

FIG. 5 illustrates an example simplified procedure 500 for managing a data session associated with User Equipment (UE) in a communication network, in accordance with one or more embodiments of the blockchain session management procedure.

Procedure 500 can represent operations of a blockchain session management process (e.g., blockchain session management process/services 246) that may be performed by one or more NF entities (e.g., device/entity 200) in a core network such as SBA 132. For example, the NF entities can include, for example, an AMF entity (AMF 320), an SMF entity (SMF 325), a PCF entity (PCF 345), and/or a NEF entity (NEF 335).

Procedure 500 begins at step 505 and continues on to step 510 where, as discussed above, the SMF entity receives session request data associated with User Equipment (UE, such as UE 308). Notably, the session request data may be sent to the SMF entity from an AMF entity. In addition, the session request data can include blockchain authentication data associated with the UE (e.g., blockchain authentication credentials, blockchain entity identifiers which identify a Blockchain Authentication Function (BAF such as BAF 305), other information to solicit blockchain payment data from the BAF, etc.)

Next, at step 515, the SMF entity selects the BAF based on the session request data. As mentioned, the session request data can include identification information indicating an appropriate blockchain service provider to authenticate/authorize (and issue payment tokens) for the UE. After selecting the appropriate BAF, procedure continues to step 520 where at least a portion of the blockchain authentication data is exchanged between the SMF entity and the BAF entity over a blockchain network interface. For example, the blockchain network interface can include the above discussed BCx, BCy, and/or BCz interfaces, which expose the blockchain platform (e.g., enterprise blockchain network, including blockchain service providers or BAFs) to the core network. In addition, in some embodiments, the SMF can invoke an NEF entity (e.g., NEF 335) to act as a gateway between the BAF and the core network. In these embodiments, SMF sends blockchain authentication data to the NEF entity, which in turn sends the blockchain authentication data to the BAF entity over the blockchain network interface. Likewise, the BAF entity can communicate with SMF by sending responsive blockchain authentication data (e.g., authentication confirmation data for successful (or failed) transactions, blockchain payment data/credits, etc.) to the NEF entity over the blockchain network interface, which causes the NEF entity to send the responsive blockchain authentication data to the SMF entity.

The SMF entity receives, at step 525, authentication confirmation data from the BAF entity and establishes, at step 530 a session with the UE based on the same. In some embodiments, a PCF entity can apply a restricted access policy to the session while one or more NFs perform a blockchain credit check/charging event process. For example, at step 540, the SMF entity and/or the PCF entity can solicit blockchain payment credits such as blockchain tokens from the BAF entity over the network interface as part of the blockchain credit check/charging event process. In response, the PCF entity determines the blockchain payment credits satisfies a contract for one or more network resources/services and updates, at step 545, the restricted access policy to permit the UE access to such resources/services. Procedure subsequently ends at step 550, but may return again to step 510 where the SMF receives session request data associated with the UE.

It should be noted that certain steps within procedure 500 may be optional, and further, the steps shown in FIG. 5 are merely example steps for illustration—certain other steps may be included or excluded as desired. Further, the particular order of the steps is merely illustrative, and it is appreciated that any suitable arrangement of the steps may be utilized without departing from the scope of the embodiments herein.

The techniques described herein, therefore, provide a natively integrated blockchain platform for wireless networks. This native blockchain platform supports new use cases that create opportunities to share network resources across multiple provider networks, increase workload mobility security, improve billing/mediation and reconciliation and create mechanisms for roaming authentication/registration using blockchain technology. In addition, the native blockchain platform provides new opportunities for the app economy and creates a new market place for Mobile virtual network operators (MVNO) participation. As discussed above the native blockchain platform facilitates new methods for authenticating UE when attaching the UE to the network as well as managing sessions for the UE. Moreover, the native blockchain platform can be leveraged to natively facilitate payments for network services as part of blockchain charging events.

While there have been shown and described illustrative embodiments of the native blockchain platform and corresponding operations in a specific network context (e.g., a mobile core network for a 5G network), it is to be understood that various other adaptations and modifications may be made within the spirit and scope of the embodiments herein. For example, the embodiments and operations disclosed herein have been described with respect to certain devices, NFs, interfaces, and systems, however it is appreciated that such embodiments are provided for purposes of example, not limitation and that the blockchain authentication techniques disclosed herein can be incorporated as part of existing wireless networks.

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for managing a data session for User Equipment (UE) in a communication network, the method comprising:
    receiving, by a Session Management Function (SMF) entity, session request data associated with User Equipment (UE), the session request data including blockchain authentication data;
    selecting, by the SMF, a Blockchain Authentication Function (BAF) entity based on the session request data;
    exchanging at least a portion of the blockchain authentication data between the SMF entity and the BAF entity over a blockchain network interface;
    receiving, by the SMF, authentication confirmation data from the BAF entity over the blockchain network interface; and
    establishing a data session associated with the UE based on the authentication confirmation data.

2. The method of claim 1, wherein the blockchain authentication data includes blockchain credentials associated with the UE, and
    wherein exchanging the blockchain authentication data between the SMF and the BAF entity further comprises exchanging the blockchain credentials associated with the UE over the blockchain network interface.

3. The method of claim 1, further comprising:
    applying a restricted access policy for the data session;
    soliciting blockchain payment credits from the BAF entity over the blockchain network interface;
    determining the blockchain payment credits satisfy a payment criteria for one or more network services as part of a blockchain charging event; and
    updating the restricted access policy to permit the UE access to the one or more network services based on the blockchain charging event.

4. The method of claim 1, wherein exchanging the blockchain authentication data between the SMF and the BAF further comprises:
    selecting, by the SMF, a Network Exposure Function (NEF) entity to communicate with the BAF over the blockchain network interface.

5. The method of claim 1, further comprising:
    selecting the SMF entity based on the blockchain authentication data.

6. The method of claim 1, wherein the session request data comprises Single Network Slice Selection Assistance Information (N-SSAI) that includes the blockchain authentication data.

7. The method of claim 1, wherein the session request data comprises Single Network Slice Selection Assistance Information (N-SSAI) that includes at least a portion of the blockchain authentication data in a slice/service type (SST) value.

8. The method of claim 1, wherein the data session includes at least one of a Protocol Data Unit (PDU) session or a Packet Data Network (PDN) session.

9. The method of claim 1, wherein establishing the data session further comprises establishing the data session for a network slice associated with the UE.

10. The method of claim 1, wherein establishing the data session further comprises:
    selecting a User Plane Function entity to serve the data session.

11. The method of claim 1, wherein the session request data includes a Service Management (SM) Data Network (DN) request container message.

12. A network function (NF) device, comprising:
    one or more network interfaces to communicate within a communication network;
    a processor coupled to the network interfaces; and
    a memory configured to store a process executable by the processor, the process when executed operable to:
        receive session request data associated with a User Equipment (UE), the session request data including blockchain authentication data;
        select a Blockchain Authentication Function (BAF) entity based on the session request data;
        exchange at least a portion of the blockchain authentication data with the BAF entity over a blockchain network interface;
        receive authentication confirmation data from the BAF entity over the blockchain network interface; and
        establish a data session associated with the UE based on the authentication confirmation data.

13. The NF device of claim 12, wherein the blockchain authentication data includes blockchain credentials associated with the UE, and
    wherein the process to exchange the blockchain authentication data with the BAF entity is further operable to exchange the blockchain credentials associated with the UE over the blockchain network interface.

14. The NF device of claim 12, wherein the process, when executed, is further operable to:
apply a restricted access policy for the data session;
solicit blockchain payment credits from the BAF entity over the blockchain network interface;
determine the blockchain payment credits satisfy a payment criteria for one or more network services as part of a blockchain charging event; and
update the restricted access policy to permit the UE access to the one or more network services based on the blockchain charging event.

15. The NF device of claim 12, wherein the process to exchange the blockchain authentication data with the BAF, when executed, is further operable to:
select a Network Exposure Function (NEF) entity to communicate with the BAF over the blockchain network interface.

16. The NF device of claim 12, wherein the session request data comprises Single Network Slice Selection Assistance Information (N-SSAI) that includes the blockchain authentication data.

17. The NF device of claim 12, wherein the session request data comprises Single Network Slice Selection Assistance Information (N-SSAI) that includes at least a portion of the blockchain authentication data in a slice/service type (SST) value.

18. A tangible, non-transitory, computer-readable media having instructions encoded thereon, the instructions, when executed by a processor, are operable to perform operations comprising:
receive, by a Network Function (NF) entity, session request data associated with a User Equipment (UE), the session request data including blockchain authentication data;
select, by the NF entity, a Blockchain Authentication Function (BAF) entity based on the session request data;
exchange, by the NF entity, at least a portion of the blockchain authentication data with the BAF entity over a blockchain network interface;
receive, by the NF entity, authentication confirmation data from the BAF entity over the blockchain network interface; and
establish a data session associated with the UE based on the authentication confirmation data.

19. The tangible, non-transitory, computer-readable media of claim 18, wherein the instructions, when executed by the processor, are further operable to:
apply a restricted access policy for the data session;
solicit blockchain payment credits from the BAF entity over the blockchain network interface;
determine the blockchain payment credits satisfy a payment criteria for one or more network services as part of a blockchain charging event; and
update the restricted access policy to permit the UE access to the one or more network services based on the blockchain charging event.

20. The tangible, non-transitory, computer-readable media of claim 18, wherein the session request data comprises Single Network Slice Selection Assistance Information (N-SSAI) that includes at least a portion of the blockchain authentication data in a slice/service type (SST) value.

* * * * *